US012572552B1

(12) United States Patent
Shah et al.

(10) Patent No.: US 12,572,552 B1
(45) Date of Patent: Mar. 10, 2026

(54) USING MACHINE-LEARNING MODEL OF AN ONLINE SYSTEM TO FACILITATE PERFORMING TASKS OF NEW TYPES

(71) Applicant: Maplebear Inc., San Francisco, CA (US)

(72) Inventors: Naval Shah, Toronto (CA); Hua Xiao, Toronto (CA); Brent Scheibelhut, Toronto (CA); Charles Wesley, San Diego, CA (US); Mark Oberemk, Toronto (CA); Michael John Remmer Ryzewic, Ithaca, NY (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/984,613

(22) Filed: Dec. 17, 2024

(51) Int. Cl.
| | |
|---|---|
| *G06F 16/2457* | (2019.01) |
| *G06F 16/22* | (2019.01) |
| *G06F 16/3329* | (2025.01) |
| *G06F 16/334* | (2025.01) |
| *G06Q 10/0834* | (2023.01) |

(52) U.S. Cl.
CPC .... *G06F 16/24578* (2019.01); *G06F 16/2282* (2019.01); *G06F 16/3329* (2019.01); *G06F 16/3344* (2019.01); *G06Q 10/0834* (2013.01)

(58) Field of Classification Search
None
See application file for complete search history.

(56) References Cited

U.S. PATENT DOCUMENTS

| | | | | |
|---|---|---|---|---|
| 11,089,162 B1 * | 8/2021 | Traba | ............... | G06Q 10/06398 |
| 11,138,479 B2 * | 10/2021 | Zhou | ..................... | G06F 16/538 |
| 11,553,090 B2 * | 1/2023 | Traba | ............... | G06Q 10/06398 |
| 11,582,324 B2 * | 2/2023 | Diesch | .................. | H04L 67/108 |
| 12,278,740 B2 * | 4/2025 | Joshi | ...................... | G06Q 50/10 |
| 12,475,150 B2 * | 11/2025 | Aggarwal | ............. | G06F 16/332 |
| 12,482,239 B2 * | 11/2025 | Duffy | ................... | G06N 3/0455 |
| 12,488,301 B2 * | 12/2025 | Raman | ............. | G06Q 10/06393 |
| 12,505,137 B1 * | 12/2025 | Liu | ...................... | G06F 16/3344 |
| 12,511,929 B1 * | 12/2025 | Penfield | ............... | G06V 40/103 |
| 2020/0410304 A1 * | 12/2020 | Zhou | ..................... | G06F 16/137 |
| 2021/0243303 A1 * | 8/2021 | Khatri | ............. | G06Q 10/06393 |
| 2021/0377392 A1 * | 12/2021 | Traba | .................. | H04M 3/5233 |

(Continued)

OTHER PUBLICATIONS

Machine Learning as an Analytics Service System (Year: 2018).*
MLAgentBench: Evaluating Language Agents on Machine Learning Experimentation (Year: 2023).*

*Primary Examiner* — Kim T Nguyen
(74) *Attorney, Agent, or Firm* — Fenwick & West LLP

(57) ABSTRACT

An online system uses a machine-learning model to identify servicing agents suited to perform tasks of new types. The online system maintains a list of tuples for servicing agents, each tuple including a score for a servicing agent and an identifier of a task type, the score indicating a level of aptitude of the servicing agent to perform a task of the task type. Upon obtaining a description for a task of a new type, the online system applies the machine-learning model to the list of tuples and the description for the task to generate a task score for each servicing agent that is indicative of a level of aptitude of each servicing agent for performing the task of the new type. The online system selects, using the task score for each servicing agent, servicing agents to whom the online system offers the task of the new type.

19 Claims, 5 Drawing Sheets

(56)          References Cited

U.S. PATENT DOCUMENTS

| | | | |
|---|---|---|---|
| 2023/0067446 A1* | 3/2023 | Diesch | H04L 9/3236 |
| 2023/0146336 A1* | 5/2023 | Wang | G06N 3/045 |
| | | | 705/26.1 |
| 2024/0414044 A1* | 12/2024 | Verma | G06F 11/2294 |
| 2025/0045619 A1* | 2/2025 | Zhang | G06N 20/00 |
| 2025/0139527 A1* | 5/2025 | Gopalkrishna | G06N 3/08 |
| 2025/0184210 A1* | 6/2025 | Pahud | H04L 41/046 |
| 2025/0218179 A1* | 7/2025 | Miech | G06V 10/82 |
| 2025/0219832 A1* | 7/2025 | Naanaa | G06F 16/335 |
| 2025/0363141 A1* | 11/2025 | Mahfoud | G06F 16/34 |
| 2025/0390517 A1* | 12/2025 | Wu | G06F 16/3329 |
| 2025/0390525 A1* | 12/2025 | Liu | G06F 16/3344 |

* cited by examiner

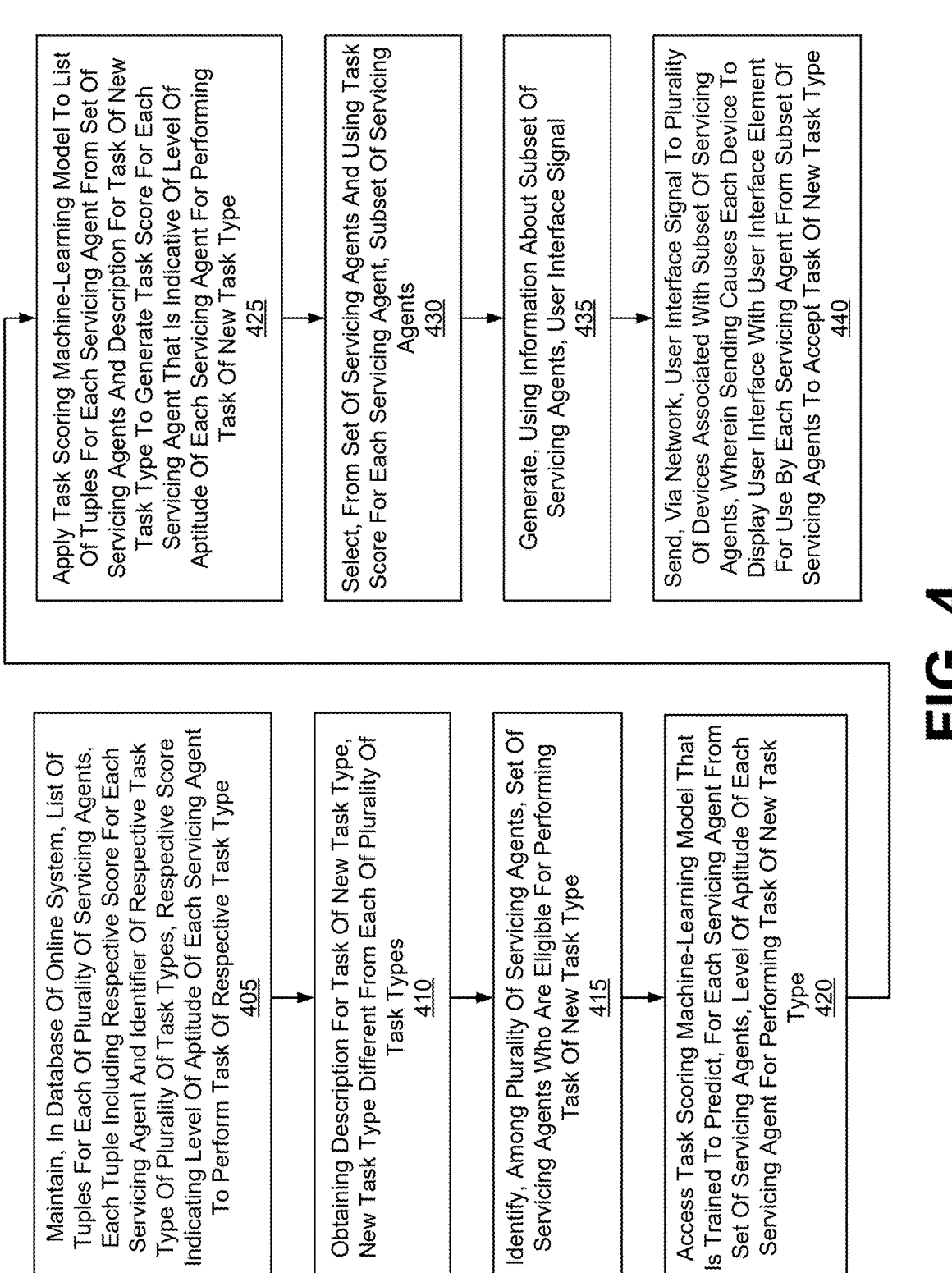

Maintain, In Database Of Online System, List Of Tuples For Each Of Plurality Of Servicing Agents, Each Tuple Including Respective Score For Each Servicing Agent And Identifier Of Respective Task Type Of Plurality Of Task Types, Respective Score Indicating Level Of Aptitude Of Each Servicing Agent To Perform Task Of Respective Task Type
405

Obtaining Description For Task Of New Task Type, New Task Type Different From Each Of Plurality Of Task Types
410

Identify, Among Plurality Of Servicing Agents, Set Of Servicing Agents Who Are Eligible For Performing Task Of New Task Type
415

Access Task Scoring Machine-Learning Model That Is Trained To Predict, For Each Servicing Agent From Set Of Servicing Agents, Level Of Aptitude Of Each Servicing Agent For Performing Task Of New Task Type
420

Apply Task Scoring Machine-Learning Model To List Of Tuples For Each Servicing Agent From Set Of Servicing Agents And Description For Task Of New Task Type To Generate Task Score For Each Servicing Agent That Is Indicative Of Level Of Aptitude Of Each Servicing Agent For Performing Task Of New Task Type
425

Select, From Set Of Servicing Agents And Using Task Score For Each Servicing Agent, Subset Of Servicing Agents
430

Generate, Using Information About Subset Of Servicing Agents, User Interface Signal
435

Send, Via Network, User Interface Signal To Plurality Of Devices Associated With Subset Of Servicing Agents, Wherein Sending Causes Each Device To Display User Interface With User Interface Element For Use By Each Servicing Agent From Subset Of Servicing Agents To Accept Task Of New Task Type
440

USING MACHINE-LEARNING MODEL OF AN ONLINE SYSTEM TO FACILITATE PERFORMING TASKS OF NEW TYPES

BACKGROUND

An online system is used for placing online orders so that users of the online system can perform online purchases of various items (e.g., groceries) offered by sources (e.g., retailers). Typically, items are picked and packed at source locations by servicing agents (or pickers), and then delivered by the servicing agents to users of the online system. Beyond the traditional pick, pack, and deliver task, new types of tasks for the servicing agents may occasionally be defined, such as new types of tasks that can be assigned to servicing agents in new geographic regions. For example, the new types of tasks can include consumer packaged goods (CPG) centric tasks such as shelf restocking, inventory checks, and other tasks that are different in some ways from the tasks that the servicing agents traditionally perform.

As new types of tasks are introduced in different geographic areas, it is desirable to promote the new types of tasks to available servicing agents, e.g., to increase their work flexibility and earnings potential. However, this requires a prediction of which of the servicing agents will perform which new task type particularly well, especially when the online system does not have a track record for a new type of task. As the number of different new types of tasks increases, a traditional rating approach applied across various types of tasks cannot be utilized, as the new types of tasks may be different from existing types of tasks.

One approach for predicting whether a specific servicing agent can perform a specific task could be by using a machine-learning model. However, traditional machine-learning models need to be trained using training data. However, for newly defined tasks, there is no training data (or at least very little training data) since the new tasks have not yet been performed. Thus, there is a technical limitation of how to train a machine-learning model to predict how a servicing agent will perform a task of a new type, when there is no historical data for how different servicing agents have performed that task.

Therefore, there is a technical problem of how to automatically and at a large scale as required by the online system identify which servicing agents are suited to perform tasks of new types, so that the online system can better offer these new types of tasks to the right servicing agents.

SUMMARY

Embodiments of the present disclosure are directed to using a machine-learning model that is trained to identify servicing agents suited to perform tasks of new types. Embodiments of the present disclosure are further directed to solving the cold start problem for when it is desirable to predict a servicing agent's performance of a newly defined type of task, but without needing historical data on performance of that same task.

In accordance with one or more aspects of the disclosure, the online system maintains, in a database of the online system, a list of tuples for each of a plurality of servicing agents, each tuple in the list of tuples including a respective score for each of the plurality of servicing agents and an identifier of a respective task type of a plurality of task types, the respective score indicating a level of aptitude of each of the plurality of servicing agents to perform a task of the respective task type. The online system obtains a description for a task of a new task type, the new task type different from each of the plurality of task types. The online system identifies, among the plurality of servicing agents, a set of servicing agents who are eligible for performing the task of the new task type. The online system accesses a task scoring machine-learning model of the online system, wherein the task scoring machine-learning model is trained to predict, for each servicing agent from the set of servicing agents, a level of aptitude of each servicing agent from the set of servicing agents for performing the task of the new task type. The online system applies the task scoring machine-learning model to the list of tuples for each servicing agent from the set of servicing agents and the description for the task of the new task type to generate a task score for each servicing agent from the set of servicing agents that is indicative of the level of aptitude of each servicing agent from the set of servicing agents for performing the task of the new task type. The online system selects, from the set of servicing agents and using the task score for each servicing agent, a subset of servicing agents. The online system generates, using information about the subset of servicing agents, a first user interface signal. The online system sends, via a network, the first user interface signal to a plurality of devices associated with the subset of servicing agents, wherein the sending the first user interface signal causes each of the plurality of devices to display a user interface with a user interface element for use by each servicing agent from the subset of servicing agents to accept the task of the new task type.

BRIEF DESCRIPTION OF THE DRAWINGS

FIG. 4 is a flowchart for a method of using a trained machine-learning model of an online system to identify servicing agents for performing tasks of new types, in accordance with one or more embodiments.

DETAILED DESCRIPTION

Figure 1A:
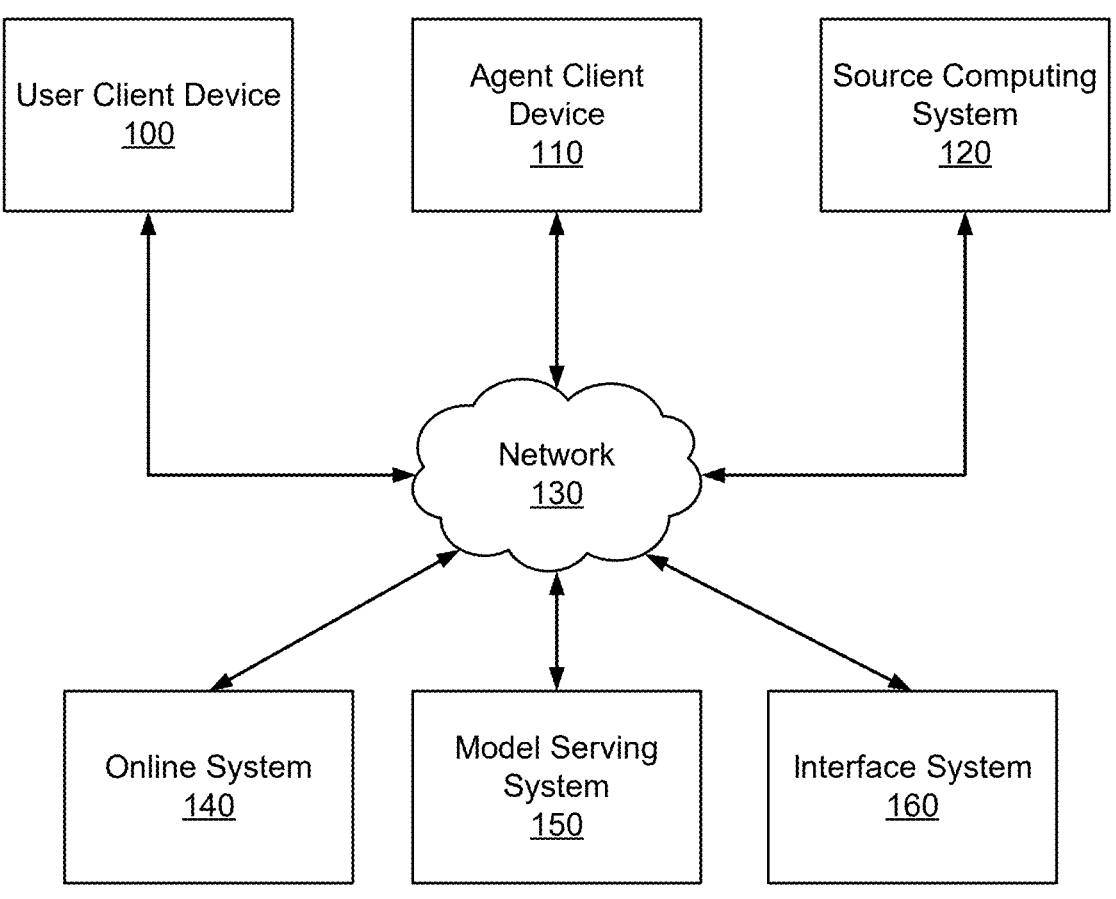
FIG. 1A illustrates an example system environment for an online system, in accordance with one or more embodiments.

FIG. 1A illustrates an example system environment for an online system 140, in accordance with one or more embodiments. The system environment illustrated in FIG. 1A includes a user client device 100, an agent client device 110, a source computing system 120, a network 130, an online system 140, a model serving system 150, and an interface system 160. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

Although one user client device 100, agent client device 110, and source computing system 120 are illustrated in FIG.

1A, any number of users, servicing agents (e.g., pickers), and sources may interact with the online system 140. As such, there may be more than one user client device 100, agent client device 110, or source computing system 120.

The user client device 100 is a client device through which a user may interact with the agent client device 110, the source computing system 120, or the online system 140. The user client device 100 can be a personal or mobile computing device, such as a smartphone, a tablet, a laptop computer, or desktop computer. In some embodiments, the user client device 100 executes a client application that uses an application programming interface (API) to communicate with the online system 140.

A user uses the user client device 100 to place an order with the online system 140. An order specifies a set of items to be delivered to the user. An "item," as used herein, means a good or product that can be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more sources from which the ordered items should be collected.

The user client device 100 presents an ordering interface to the user. The ordering interface is a user interface that the user can use to place an order with the online system 140. The ordering interface may be part of a client application operating on the user client device 100. The ordering interface allows the user to search for items that are available through the online system 140 and the user can select which items to add to an "ordering list." An "ordering list," as used herein, is a tentative set of items that the user has selected for an order but that has not yet been finalized for an order. The ordering list may alternatively be referred to as a "cart" or "shopping cart." The ordering interface allows a user to update the ordering list, e.g., by changing the quantity of items, adding or removing items, or adding instructions for items that specify how the item should be collected.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with an agent that is servicing the user's order. This communication interface allows the user to input a text-based message to transmit to the agent client device 110 via the network 130. The agent client device 110 receives the message from the user client device 100 and presents the message to the servicing agent. The agent client device 110 also includes a communication interface that allows the servicing agent to communicate with the user. The agent client device 110 transmits a message provided by the servicing agent to the user client device 100 via the network 130. In some embodiments, messages sent between the user client device 100 and the agent client device 110 are transmitted through the online system 140. In addition to text messages, the communication interfaces of the user client device 100 and the agent client device 110 may allow the user and the servicing agent to communicate through audio or video communications, such as a phone call, a voice-over-IP call, or a video call.

The agent client device 110 is a client device through which a servicing agent may interact with the user client device 100, the source computing system 120, or the online system 140. The agent client device 110 can be a personal or mobile computing device, such as a smartphone, a tablet, a laptop computer, or a desktop computer. In some embodiments, the agent client device 110 executes a client application that uses an application programming interface (API) to communicate with the online system 140.

The agent client device 110 receives orders from the online system 140 for the servicing agent to service. A servicing agent (also referred to herein as an agent or picker) services an order by collecting the items listed in the order from a source. The agent client device 110 presents the items that are included in the user's order to the servicing agent in a collection interface. The collection interface is a user interface that provides information to the servicing agent on which items to collect for a user's order and the quantities of the items. In some embodiments, the collection interface provides multiple orders from multiple users for the servicing agent to service at the same time from the same source location. The collection interface further presents instructions that the user may have included related to the collection of items in the order. Additionally, the collection interface may present a location of each item at the source, and may even specify a sequence in which the servicing agent should collect the items for improved efficiency in collecting items. In some embodiments, the agent client device 110 transmits to the online system 140 or the user client device 100 which items the servicing agent has collected in real time as the servicing agent collects the items.

The servicing agent can use the agent client device 110 to keep track of the items that the servicing agent has collected to ensure that the servicing agent collects all the items for an order. The agent client device 110 may include a barcode scanner that can decode an item identifier encoded in a machine-readable label (e.g., a barcode or a QR code) coupled to an item. The agent client device 110 compares this item identifier to items in the order that the servicing agent is servicing, and if the item identifier corresponds to an item in the order, the agent client device 110 identifies the item as collected. In some embodiments, rather than or in addition to using a barcode scanner, the agent client device 110 captures one or more images of the item and identifies the item identifier for the item based on the images. The agent client device 110 may determine the item identifier directly or by transmitting the images to the online system 140. Furthermore, the agent client device 110 determines weights for items that are priced by weight. The agent client device 110 may prompt the servicing agent to manually input the weight of an item or may communicate with a weighing system in the source location to receive the weight of an item.

When the servicing agent has collected the items for an order, the agent client device 110 instructs a servicing agent on where to deliver the items for a user's order. For example, the agent client device 110 displays a delivery location from the order to the servicing agent. The agent client device 110 also provides navigation instructions for the servicing agent to travel from the source location to the delivery location. When a servicing agent is servicing more than one order, the agent client device 110 identifies which items should be delivered to which delivery location. The agent client device 110 may provide navigation instructions from the source location to each of the delivery locations. The agent client device 110 may receive one or more delivery locations from the online system 140 and may provide the delivery locations to the servicing agent so that the servicing agent can deliver the corresponding one or more orders to those locations. The agent client device 110 may also provide navigation instructions for the servicing agent from the source location from which the servicing agent collected the items to the one or more delivery locations.

In some embodiments, the agent client device 110 tracks the location of the servicing agent as the servicing agent delivers orders to delivery locations. The agent client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the servicing agent based on the servicing agent's location. For example, if the servicing agent takes a wrong turn while traveling to a delivery location, the online system 140 determines the servicing agent's updated location based on location data from the agent client device 110 and generates updated navigation instructions for the servicing agent based on the updated location.

In some embodiments, the servicing agent is a single person who collects items for an order from a source location and delivers the order to the delivery location for the order. Alternatively, more than one person may serve the role of a servicing agent for an order. For example, multiple people may collect the items at the source location for a single order. Similarly, the person who delivers an order to its delivery location may be different from the person or people who collected the items from the source location. In these embodiments, each person may have an agent client device 110 that they can use to interact with the online system 140.

Additionally, while the description herein may primarily refer to servicing agents as humans, in some embodiments, some or all of the steps taken by the servicing agent may be automated. For example, a semi- or fully-autonomous robot may collect items in a source location for an order and an autonomous vehicle may deliver an order to a user from a source location.

In one or more embodiments, the online system 140 communicates with a smart shopping cart being used by a user to collect items in a source location. For example, the smart shopping cart may display content received from the online system 140 and may receive data describing items that are collected by the user and stored in a storage area of the shopping cart. In some embodiments, the smart shopping cart is an agent client device 110 being operated by a servicing agent collecting items within a source location. Similarly, the smart shopping cart may be operated by a user within the source location collecting items for themselves. Example embodiments of smart shopping carts are described in U.S. patent application Ser. No. 18/630,672, entitled "Automated Identification of Items Placed in a Cart and Recommendations based on Same," filed Apr. 9, 2024, which is hereby incorporated by reference in its entirety.

The source computing system 120 is a computing system operated by a source that interacts with the online system 140. As used herein, a "source" is an entity that operates a "source location," which is a store, warehouse, or any other source from which a servicing agent can collect items. The source computing system 120 stores and provides item data to the online system 140 and may regularly update the online system 140 with updated item data. For example, the source computing system 120 provides item data indicating which items are available at a particular source location and the quantities of those items. Additionally, the source computing system 120 may transmit updated item data to the online system 140 when an item is no longer available at the source location. Additionally, the source computing system 120 may provide the online system 140 with updated item prices, sales, or availabilities. Additionally, the source computing system 120 may receive payment information from the online system 140 for orders serviced by the online system 140. Alternatively, the source computing system 120 may provide payment to the online system 140 for some portion of the overall cost of a user's order (e.g., as a commission).

The user client device 100, the agent client device 110, the source computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of the standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which users can order items to be provided to them by a servicing agent from a source. The online system 140 receives orders from a user client device 100 through the network 130. The online system 140 selects a servicing agent to service the user's order and transmits the order to an agent client device 110 associated with the servicing agent. If the servicing agent accepts the order, the servicing agent collects the ordered items from a source location and delivers the ordered items to the user. The online system 140 may charge a user for the order and provide portions of the payment from the user to the servicing agent and the source.

As an example, the online system 140 may allow a user to order groceries from a grocery store source. The user's order may specify which groceries they want to be delivered from the grocery store and the quantities of each of the groceries. The user client device 100 transmits the user's order to the online system 140 and the online system 140 selects a servicing agent to travel to the grocery store source location to collect the groceries ordered by the user. The online system transmits an offer to the servicing agent for the servicing agent to service the order in exchange for consideration and, if the servicing agent accepts the offer, the servicing agent collects the groceries from the grocery store. Once the servicing agent has collected the groceries ordered by the user, the servicing agent delivers the groceries to a location transmitted to the agent client device 110 by the online system 140.

The online system 140 maintains a database of tasks to be performed and service agents who are available to perform the tasks. The online system 140 uses a trained machine-learning model to score each service agent's aptitude (i.e., suitability) to perform each type of task. When a new task is created, for which there is a limited amount of data about the service agents' aptitudes, the online system 140 may use the trained machine-learning model (e.g., collaborative filtering model or multitask model) that leverages understanding of the service agents' aptitudes for other related tasks. The online system 140 may then score and rank a set of service agents for the new task and select a subset of the service agents to receive a request to make themselves available for accepting tasks of new types.

Hence, the online system 140 presented herein integrates the trained machine-learning model that generates aptitude predictions for a new type of task based on the servicing agent's task history, so that the online system 140 can prompt and promote to servicing agents these new types of tasks. The machine-learning model is trained to predict the servicing agents' aptitudes for a new type of task based on features of the servicing agents and features of the new task. The online system 140 may then use this prediction to guide promotion recommendations for new types of tasks.

The model serving system 150 receives requests from the online system 140 to perform tasks using machine-learning models. The tasks include, but are not limited to, natural language processing (NLP) tasks, audio processing tasks, image processing tasks, video processing tasks, and the like. In one or more embodiments, the machine-learning models deployed by the model serving system 150 are language models configured to perform one or more NLP tasks. The NLP tasks include, but are not limited to, text generation, query processing, machine translation, chatbots, and the like. In one or more embodiments, a language model of the model serving system 150 is configured as a transformer neural network architecture (i.e., a transformer model). Specifically, the transformer model is coupled to receive sequential data tokenized into a sequence of input tokens and generates a sequence of output tokens depending on the task to be performed.

The model serving system 150 receives a request including input data (e.g., text data, audio data, image data, or video data) and encodes the input data into a set of input tokens. The model serving system 150 applies the machine-learning model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learning model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space.

However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one or more embodiments, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the online system 140 or one or more entities different from the online system 140. An LLM may be trained on a large amount of data from various data sources. For example, the data sources include websites, articles, posts on the web, and the like. From this massive amount of data coupled with the computing power of LLM, the LLM is able to perform various tasks and synthesize and formulate output responses based on information extracted from the training data.

In one or more embodiments, when the machine-learning model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In one or more other embodiments, the transformer architecture may have an encoder-decoder architecture and includes a set of encoders coupled to a set of decoders. An encoder or decoder may include one or more attention operations.

While an LLM with a transformer-based architecture is described in one or more embodiments, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

As a group of servicing agents in a region onboard a new type of task (e.g., after the group of servicing agents in the region accepts an offer to perform a new type of task), the online system 140 may employ an LLM of the model serving system 150 to dynamically generate an onboarding validation quiz and checklist that can be presented to the servicing agents. The online system 140 may prepare (e.g., via a prompting module 270 in FIG. 2) a prompt for input to the LLM. The prompt may include information about the existing task history for the servicing agents and a description of the new type of task.

The LLM may generate a response to the prompt based on execution of the machine-learning model using the prompt. The response may include specific "yes or no" questions or multiple-choice questions for the servicing agents. The online system 140 may import the response from the model serving system 150 and use the response to generate user interface signals. The online system 140 may send, via the network 130, the user interface signals to the agent client devices 110 causing the agent client devices 110 to display user interfaces with the list of questions that can be answered by the servicing agents.

In one or more embodiments, the task for the model serving system 150 is based on knowledge of the online system 140 that is fed to the machine-learning model of the model serving system 150, rather than relying on general knowledge encoded in the model weights of the model. Thus, one objective may be to perform various types of queries on the external data in order to perform any task that the machine-learning model of the model serving system 150 could perform. For example, the task may be to perform question-answering, text summarization, text generation, and the like based on information contained in an external dataset.

Thus, in one or more embodiments, the online system 140 is connected to an interface system 160. The interface system 160 receives external data from the online system 140 and builds a structured index over the external data using, for example, another machine-learned language model or heuristics. The interface system 160 receives one or more queries from the online system 140 on the external data. The interface system 160 constructs one or more prompts for input to the model serving system 150. A prompt may include the query of the user and context obtained from the structured index of the external data. In one instance, the context in the prompt includes portions of the structured indices as contextual information for the query. The interface system 160 obtains one or more responses from the model serving system 150 and synthesizes a response to the query on the external data. While the online system 140 can generate a prompt using the external data as context, often times, the amount of information in the external data exceeds prompt size limitations configured by the machine-learning language model. The interface system 160 can resolve prompt size limitations by generating a structured index of the data and offers data connectors to external data sources.

Figure 1B:
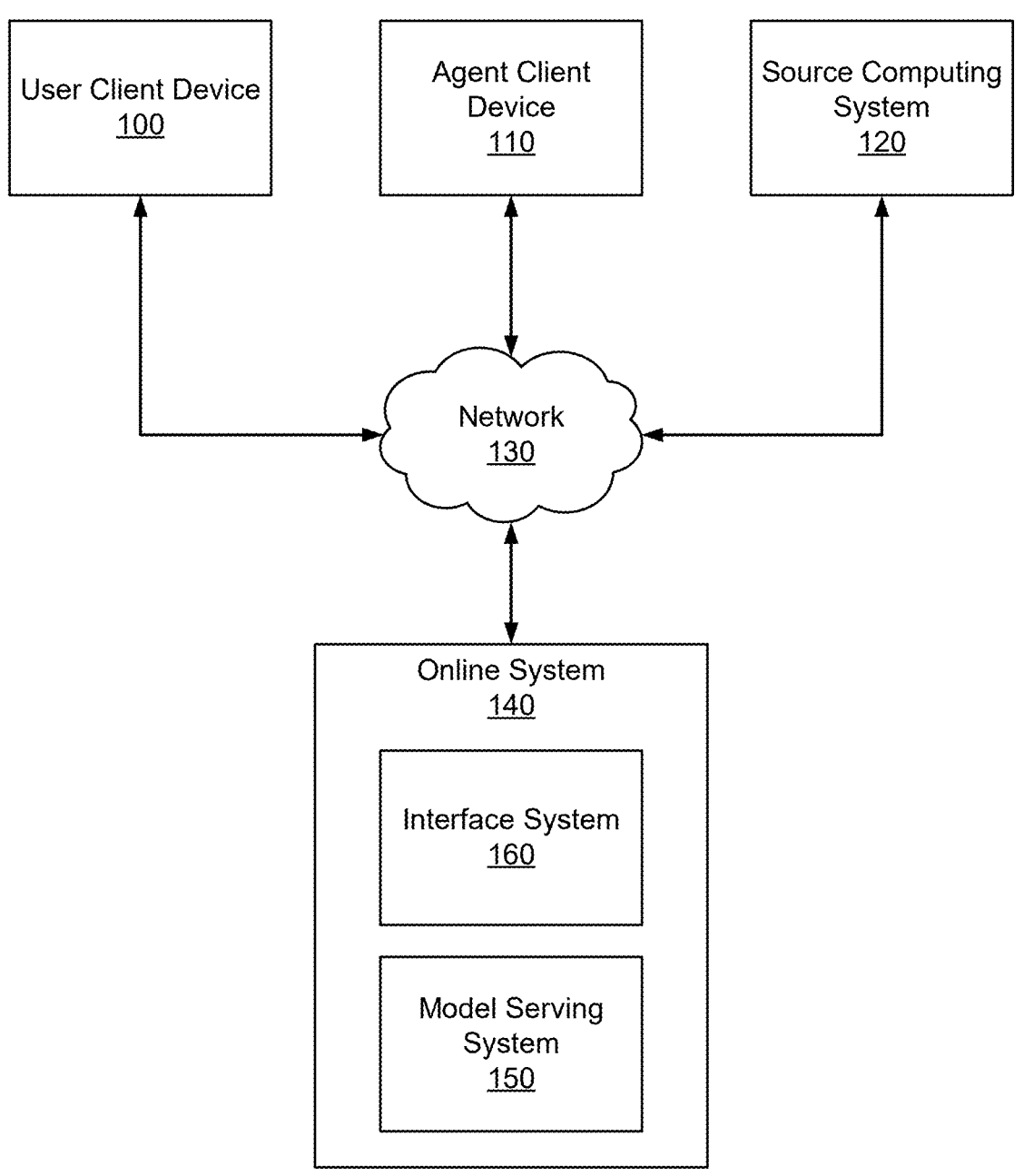
FIG. 1B illustrates an example system environment for an online system, in accordance with one or more embodiments.

FIG. 1B illustrates an example system environment for an online system 140, in accordance with one or more embodiments. The system environment illustrated in FIG. 1B includes a user client device 100, an agent client device 110, a source computing system 120, a network 130, and an online system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 and/or the interface system 160 is managed by a separate entity from the online system 140. In one or more embodiments, as illustrated in the example system environment in FIG. 1B, the model serving system 150 and/or the interface system 160 is managed and deployed by the entity managing the online system 140. The online system 140 is described in further detail below with regards to FIG. 2.

Figure 2:
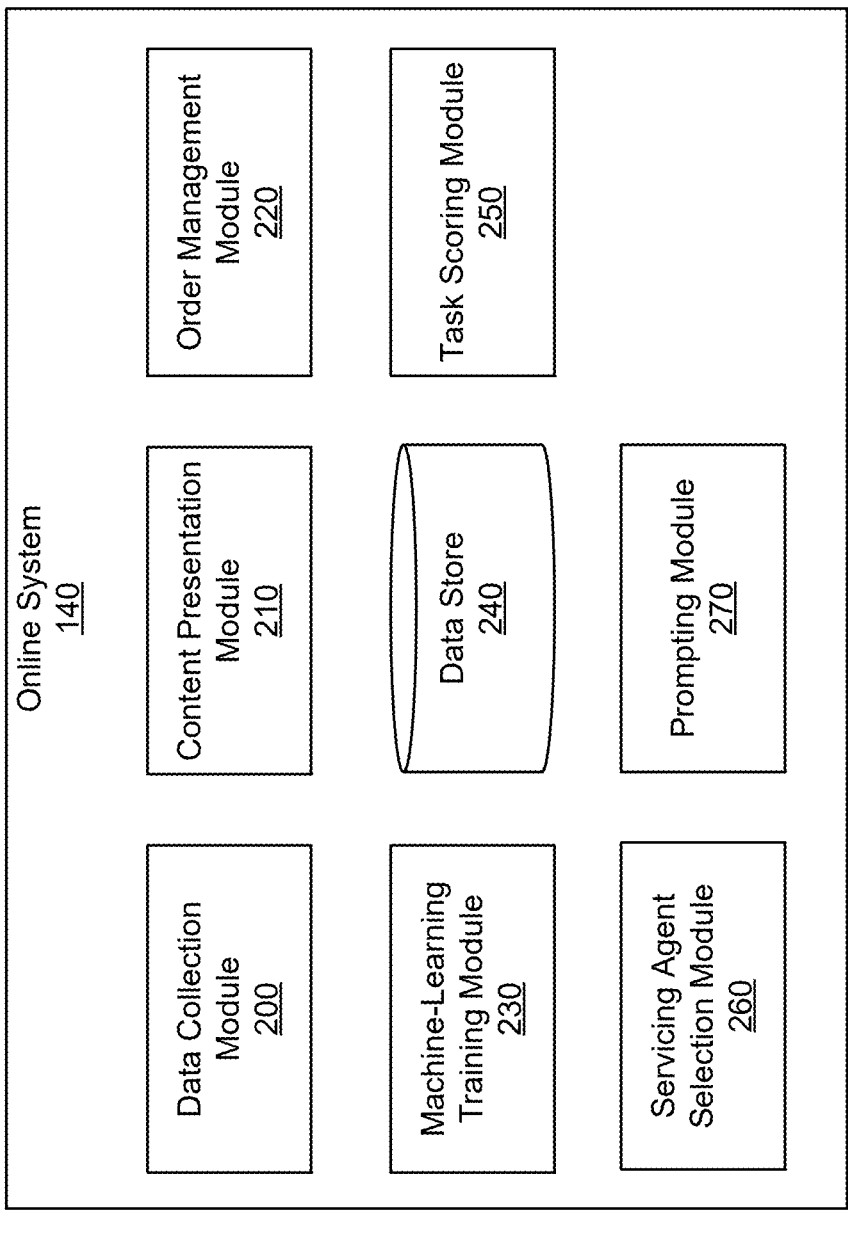
FIG. 2 illustrates an example system architecture for an online system, in accordance with one or more embodiments.

FIG. 2 illustrates an example system architecture for the online system 140, in accordance with some embodiments. The system architecture illustrated in FIG. 2 includes a data collection module 200, a content presentation module 210, an order management module 220, a machine-learning training module 230, a data store 240, a task scoring module 250, a servicing agent selection module 260, and a prompting module 270. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. In preferred embodiments, the data collection module 200 only collects data describing a user if the user has previously explicitly consented to the online system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, favorite items, or stored payment instruments. The user data also may include default settings established by the user, such as a default source/source location, payment instrument, delivery location, or delivery timeframe. The data collection module 200 may collect the user data from sensors on the user client device 100 or based on the user's interactions with the online system 140.

The data collection module 200 also collects item data, which is information or data that identifies and describes items that are available at a source location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in source locations. For example, for each item-source combination (a particular item at a particular warehouse), the item data may include a time that the item was last found, a time that the item was last not found (a servicing agent looked for the item but could not find it), the rate at which the item is found, or the popularity of the item. The data collection module 200 may collect item data from the source computing system 120, the agent client device 110, or the user client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects servicing agent data, which is information or data that describes characteristics of servicing agents. For example, the servicing agent data for a servicing agent may include the servicing agent's name, the servicing agent's location, how often the servicing agent has serviced orders for the online system 140, a user rating for the servicing agent, which sources the servicing agent has collected items at, or the servicing agent's previous shopping history. Additionally, the servicing agent data may include preferences expressed by the servicing agent, such as their preferred sources to collect items at, how far they are willing to travel to deliver items to a user, how many items they are willing to collect at a time, timeframes within which the servicing agent is willing to service orders, or payment information by which the servicing agent is to be paid for servicing orders (e.g., a bank account). The data collection module 200 collects servicing agent data from sensors of the agent client device 110 or from the servicing agent's interactions with the online system 140.

Additionally, the data collection module 200 collects order data, which is information or data that describes characteristics of an order. For example, order data may include item data for items that are included in the order, a delivery location for the order, a user associated with the order, a source location from which the user wants the ordered items collected, or a timeframe within which the user wants the order delivered. Order data may further include information describing how the order was serviced, such as which servicing agent serviced the order, when the order was delivered, or a rating that the user gave the delivery of the order. In some embodiments, the order data includes user data for users associated with the order, such as user data for a user who placed the order or servicing agent data for a servicing agent who serviced the order.

While user data, servicing agent data, source data, item data, and order data are described separately, data collected by the data collection module 200 may fall into more than one of these categories. For example, data describing a servicing agent's performance for an order may be order data and servicing agent data.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular source location. For example, the availability model may be trained to predict a likelihood that an item is available at a source location or may predict an estimated number of items that are available at a source location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from a user client device 100 and offers the orders to servicing agents for service based on servicing agent data. For example, the order management module 220 offers an order to a servicing agent based on the servicing agent's location and the location of the source from which the ordered items are to be collected. The order management module 220 may also offer an order to a servicing agent based on how many items are in the order, a vehicle operated by the servicing agent, the delivery location, the servicing agent's preferences on how far to travel to deliver an order, the servicing agent's ratings by users, or how often a servicing agent agrees to service an order.

In one or more embodiments, the order management module 220 determines when to offer an order to a servicing agent based on a delivery timeframe requested by the user with the order. The order management module 220 computes an estimated amount of time that it would take for a servicing agent to collect the items for an order and deliver the ordered items to the delivery location for the order. The order management module 220 offers the order to a servicing agent at a time such that, if the servicing agent immediately accepts and services the order, the servicing agent is likely to deliver the order at a time within the requested timeframe. Thus, when the order management module 220 receives an order, the order management module 220 may delay offering the order to a servicing agent if the requested timeframe is far enough in the future (i.e., the servicing agent may be offered the order at a later time and is still predicted to meet the requested timeframe).

When the order management module 220 offers an order to a servicing agent, the order management module 220 transmits the order to the agent client device 110 associated with the servicing agent. The order management module 220 may also transmit navigation instructions from the servicing agent's current location to the source location associated with the order. If the order includes items to collect from multiple source locations, the order management module 220 identifies the source locations to the servicing agent and may also specify a sequence in which the servicing agent should visit the source locations.

The order management module 220 may track the location of the servicing agent through the agent client device 110 to determine when the servicing agent arrives at the source location. When the servicing agent arrives at the source location, the order management module 220 transmits the order to the agent client device 110 for display to the servicing agent. As the servicing agent uses the agent client device 110 to collect items at the source location, the order management module 220 receives item identifiers for items that the servicing agent has collected for the order. In some embodiments, the order management module 220 receives images of items from the agent client device 110 and applies computer-vision techniques to the images to identify the items depicted by the images. The order management module 220 may track the progress of the servicing agent as the servicing agent collects items for an order and may transmit progress updates to the user client device 100 that describe which items have been collected for the user's order.

In one or more embodiments, the order management module 220 tracks the location of the servicing agent within the source location. The order management module 220 uses sensor data from the agent client device 110 or from sensors in the source location to determine the location of the servicing agent in the source location. The order management module 220 may transmit, to the agent client device 110, instructions to display a map of the source location indicating where in the source location the servicing agent is located. Additionally, the order management module 220 may instruct the agent client device 110 to display the locations of items for the servicing agent to collect, and may further display navigation instructions for how the servicing agent can travel from their current location to the location of the next item to collect for an order.

The order management module 220 determines when the servicing agent has collected the items for an order. For example, the order management module 220 may receive a message from the agent client device 110 indicating that all of the items for an order have been collected. Alternatively, the order management module 220 may receive item identifiers for items collected by the servicing agent and determine when all of the items in an order have been collected. When the order management module 220 determines that the servicing agent has completed an order, the order management module 220 transmits the delivery location for the order to the agent client device 110. The order management module 220 may also transmit navigation instructions to the agent client device 110 that specify how to travel from the source location to the delivery location, or to a subsequent source location for further item collection. The order management module 220 tracks the location of the servicing agent as the servicing agent travels to the delivery location for an order, and updates the user with the location of the servicing agent so that the user can track the progress of the order. In some embodiments, the order management module 220 computes an estimated time of arrival of the servicing agent at the delivery location and provides the estimated time of arrival to the user.

In one or more embodiments, the order management module 220 facilitates communication between the user client device 100 and the agent client device 110. As noted above, a user may use a user client device 100 to send a message to the agent client device 110. The order management module 220 receives the message from the user client device 100 and transmits the message to the agent client device 110 for presentation to the servicing agent. The servicing agent may use the agent client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes the total cost for the order and charges the user that cost. The order management module 220 may provide a portion of the total cost to the servicing agent for servicing the order, and another portion of the total cost to the source.

The machine-learning training module 230 trains machine-learning models used by the online system 140. The online system 140 may use machine-learning models to perform functionalities described herein. Example machine-learning models include regression models, support vector machines, naïve Bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, transformers, large-language models, or multi-modal large language models. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, servicing agent data, item data, or order data. In some cases, the training examples also include a label which represents an expected output of the machine-learning model. In these cases, the machine-learning model is trained by comparing its output from the input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In one or more embodiments, the machine-learning training module 230 may retrain the machine-learning model based on the actual performance of the model after the online system 140 has deployed the model to provide service to users. For example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein.

The data store 240 stores data used by the online system 140. For example, the data store 240 stores user data, item data, order data, and servicing agent data for use by the online system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

With respect to the machine-learning models hosted by the model serving system 150, the machine-learning models may already be trained by a separate entity from the entity responsible for the online system 140. In one or more other embodiments, when the model serving system 150 is included in the online system 140, the machine-learning training module 230 may further train parameters of the machine-learning model based on data specific to the online system 140 stored in the data store 240. As an example, the machine-learning training module 230 may obtain a pre-trained transformer language model and further fine tune the parameters of the transformer language model using training data stored in the data store 240. The machine-learning training module 230 may provide the transformer language model to the model serving system 150 for deployment.

To facilitate recommendation and promotion of additional (e.g., new) task types to a servicing agent, the task scoring module 250 may access a task scoring model (e.g., machine-learning model) that is trained to predict an aptitude (e.g., suitability) of the servicing agent for performing a specific task. The task scoring module 250 may deploy the task scoring model to run a machine-learning algorithm to input signals to generate a score that is indicative of the servicing agent's aptitude for performing the specific task. The score may be a value between 0 and 1, where a higher value of the score may indicate a higher level of the servicing agent's aptitude for performing the specific task, and a lower value of the score may indicate a lower level of the servicing agent's aptitude for performing the specific task. A set of parameters for the task scoring model may be stored at one or more non-transitory computer-readable media of the task scoring module 250. Alternatively, the set of parameters for the task scoring model may be stored at one or more non-transitory computer-readable media of the data store 240.

In one or more embodiments, the task scoring model generates a score indicative of a predicted aptitude for a <task type, servicing agent> tuple. The task scoring model may be implemented as a collaborative filtering machine-learning model. Alternatively, the task scoring model may be implemented as a multitask machine-learning model. The task scoring model may be trained to take as inputs all of historical data related to servicing agents and their task completions and ratings to generate aptitude predictions for each type of task that each servicing agent has not yet completed.

In providing the input signals to the task scoring model, the task scoring module 250 may provide servicing agent's historical data including data related to one or more existing types of tasks, one or more servicing agent's ratings for the one or more existing types of tasks, a description about a new type of task, some other data, or some combination thereof. The task scoring module 250 may retrieve the servicing agent's historical data from a servicing agent catalog database and/or a task catalog database (e.g., stored at the data store 240).

The data related to a task type and servicing agent's ratings for the task type may include a <task type, rating> tuple for a given servicing agent. Note that the rating system for each task type may vary, so that the task scoring module 250 may apply normalization to ratings across different task types. For example, the task scoring module 250 may utilize users' ratings of servicing agents for pick, pack, and deliver tasks. On the other hand, for ratings of restocking tasks, ratings provided by a source location manager can be applied.

The descriptions of new task types may need to be carefully drafted to accurately label different task types. A human may be involved in creating each new task type that encompasses a particular type of task, along with, e.g., the most important one or two features. Note that each permutation in task's features may require additional data entries for storing the description of each new task. The descriptions of new task types at the task catalog database.

Traditional tasks for a servicing agent for deliveries generally encompass pick, pack, and deliver work grouped into one "task" and a single rating. However, as the services of the online system 140 grow, this single task of pick, pack, and deliver can be split into, e.g., two tasks, one focused on "delivery" and one on "pick and pack". As servicing agents continue to get more ratings for those individual tasks, some servicing agents will be higher rated for one task vs. the other task, and the task scoring model may be trained to infer hidden features for these two task types.

A task type can be split into multiple task types when there is a notion that main features of the new task types are different from each other. This may be based on the type of work (e.g., "pick and pack" work vs. "deliver" work), but can also be based on other criteria such as a type of source. For example, it is possible that the "pick and pack" tasks at wholesale sources are fundamentally different from the "pick and pack" tasks at convenience source locations, so these "pick and pack" tasks related to different types of sources can be split into tasks of different types. Additionally, new types of tasks can cover all sorts of different task types, including non-source centric tasks, such as item returns for users, regular parcel deliveries, dry cleaning pick up, dry cleaning drop off, mobile notary, audit, restock, etc.

In providing the input signals to the task scoring model, the task scoring module 250 may further provide information about replacement success rates, users' chat (e.g., signals related to users' satisfaction with different services and assessment of different services), information about the users' explicit scoring apart from the overall rating (e.g., markers for smart bagging, good communication, smooth delivery, etc.) that can be mapped to different task types, a time taken by the servicing agent to complete a given task or sub-part of a task (e.g., finding each item, selecting a replacement item, checking out, etc.), some other information, or some combination thereof. The task scoring module 250 may retrieve these additional input signals from a user catalog database (e.g., stored at the data store 240) and/or may be received in real time from the user client device 100 and/or the agent client device 110.

In one or more embodiments, the task scoring module 250 deploys the task scoring model periodically as new servicing agents and new task types are onboarded. The task scoring model may periodically generate predictions for each servicing agent's aptitude for each task. After that, the online system 140 may define a new task type (e.g., for a specific geographic region), and the order management module 220 (or some other module of the online system 140) may identify a set of servicing agents eligible for the new task type. Then, the task scoring module 250 may deploy the task scoring model to score the eligible servicing agents for the new task type. The task scoring module may be trained for that task type, but for a different geographic region.

The machine-learning training module 230 may perform initial training of the task scoring model using training data. The machine-learning training module 230 may generate labels for the training data, where each label includes information about a rating of a servicing agent for a specific task type and users' average level of satisfaction related to the servicing agent performing this specific task type. The machine-learning training module 230 may train the task scoring model using the training data to generate initial values for the set of parameters of the task scoring model.

The machine-learning training module 230 may collect feedback data with information about a user's level of satisfaction with the servicing agent who performed a new task type, information about a source location manager's level of satisfaction with the servicing agent who performed a new task type, some other feedback information about performance of the servicing agent in relation to the new task type, or some combination thereof. The feedback data may be recorded at the user client device 100, the agent client device 110, and/or the source computing system 120 and communicated, via the network 130, to the online system 140 and the machine-learning training module 230. The machine-learning training module 230 may then re-train the task scoring model by updating the set of parameters of the task scoring model using the feedback data.

The servicing agent selection module 260 may identify servicing agents to whom to offer a task of a new type. The servicing agent selection module 260 may select, based on their scores generated by the task scoring model, a subset of eligible servicing agents (e.g., servicing agents from a specific geographic region) as those being suited to perform the task of the new type. The servicing agent selection module 260 may rank the previously identified eligible servicing agents based on their scores and then select the subset of the eligible servicing agents having their scores above a threshold score. Using information about the selected subset of servicing agents, the content presentation module 210 may generate a user interface signal that is sent, via the network 130, to a set of agent client devices 110 associated with the selected subset of servicing agents causing the set of agent client devices 110 to display user interfaces with information about the task of the new type. Each of the selected subset of servicing agents may then use a user interface of its agent client device 110 to accept or refuse the task of the new type.

As and when a servicing agent decides to take on additional task types, the online system 140 may generate an onboarding quiz displayed at a user interface of the agent client device 110 so that the servicing agent can interact with the user interface and validate meeting all requirements for a task of a new type. For example, a new task type may require certain capital costs or items (e.g., cart for moving loads, carrying container, etc.), confirmation that the servicing agent can lift a defined weight (e.g., 40 lbs.) without accommodation, bicycle, etc.

In one or more embodiments, the online system 140 utilizes an LLM (e.g., LLM of the model serving system 150) to generate an onboarding checklist for a new task type. The prompting module 270 may generate a prompt for input into the LLM. In providing the prompt for input into the LLM, the prompting module 270 may provide information about the servicing agent's existing task history, a description of a new task type, some other information, or some combination thereof. The prompting module 270 may obtain the servicing agent's existing task history based on information about tasks the servicing agent has already performed and completed. For example, if the servicing agent has already performed pick, pack, and deliver tasks, the prompting module 270 may infer that the servicing agent has a vehicle, which can be useful information for the new task type to be input into the LLM. The prompting module 270 may retrieve the description of the new task type from a task catalog database, e.g., stored at the data store 240. The description of the new task type may include a full description of the new task type, along with prose descriptions of how the task will be graded (i.e., rated), whether any additional materials or tools are required for performing the task, or if any other physical characteristics or attributes are necessary for performing the task.

An output generated by the LLM may include a list of specific "yes or no" questions or multiple-choice questions. The output generated by the LLM may be imported at the online system 140, and the content presentation module 210 may use the output from the LLM to generate a user interface signal with information about the list of questions for the servicing agent. The content presentation module 210 may send, via the network 130, the user interface signal to the agent client device 110 causing the agent client device 110 to display a user interface with the list of questions. The servicing agent may then utilize user interface elements to answer the list of questions generated by the LLM.

In one or more embodiments, the online system 140 deploys the task scoring model to generate predictions for <servicing agent, task type> tuples that match a given servicing agent with every possible task type supported by the online system 140. The task scoring module 250 may save the predicted <servicing agent, task type> tuples generated by the task scoring module in, e.g., a task catalog database (e.g., stored at the data store 240) as part of the servicing agent's metadata. The task scoring model may generate the <servicing agent, task type> tuples for all servicing agents (e.g., all servicing agents in a given region) and all task types supported by the online system 140.

At some point, a task of a new type (i.e., additional task type) may be introduced in a particular region (i.e., the task is new for this particular region) where the online system 140 operates. In such cases, the online system 140 may determine (e.g., via the order management module 220) which servicing agents are in the consideration set for this particular region. Then, the task scoring module 250 may use the stored <servicing agent, task type> tuples to identify which set of servicing agents to prompt for this additional task type. For example, the content presentation module 210 may generate a prompt message for display at user interfaces of agent client devices 110 associated with the identified set of servicing agents, such as, "A new type of task that we thought you'd be interested in learning more about is available in your area." If and when the servicing agent agrees or shows interest in this new task type, the prompting module 270 may prompt an LLM (e.g., LLM of the model serving system 150) to generate an onboarding checklist for presentation to the servicing agent via a user interface of the agent client device 110. The online system 140 may periodically deploy the task scoring model to regenerate the <servicing agent, task type> tuples predictions and refresh the metadata for the servicing agents.

Figure 3:
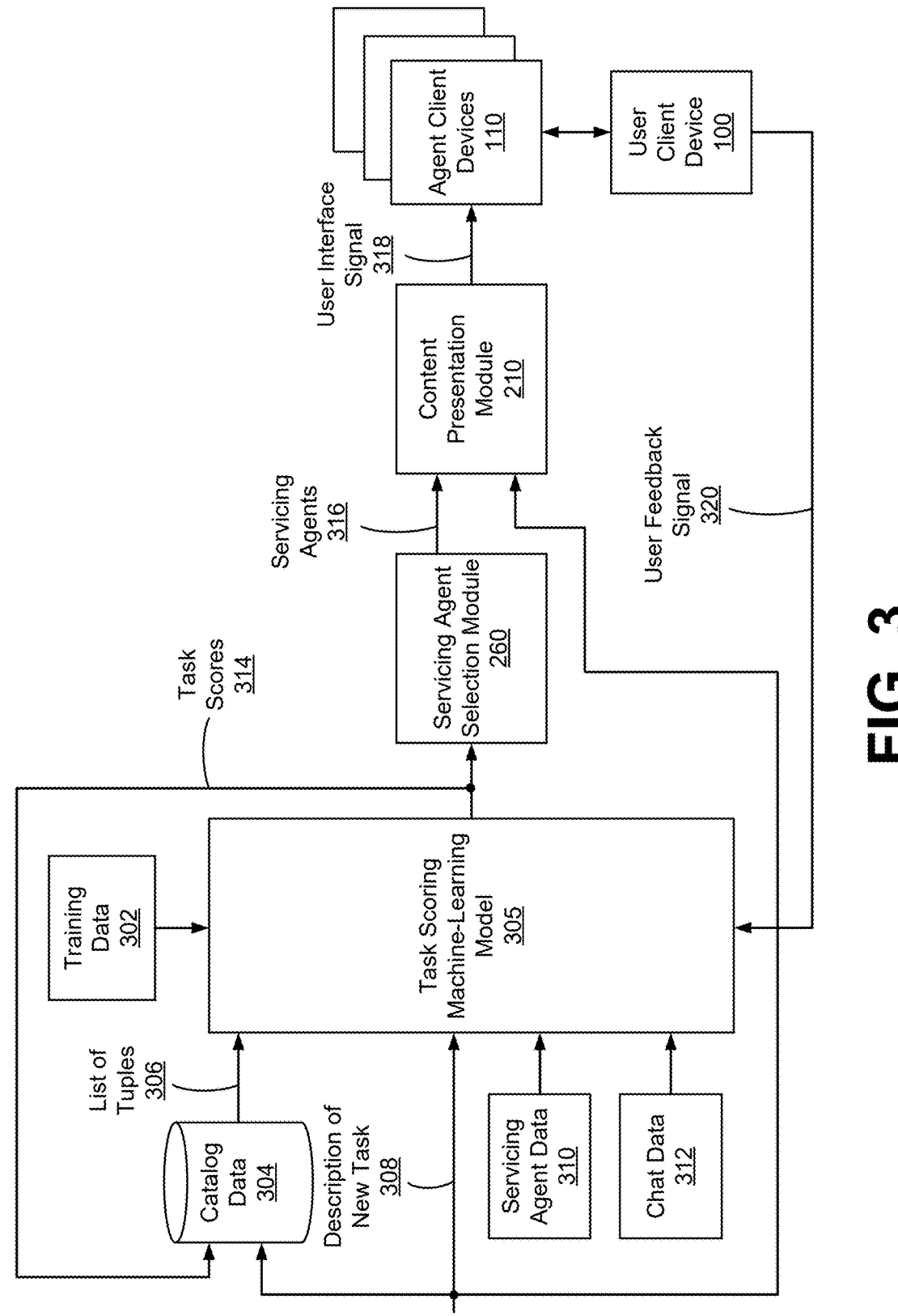
FIG. 3 illustrates an example architectural flow diagram of using a trained machine-learning model of an online system to identify servicing agents for performing tasks of new types, in accordance with one or more embodiments.

FIG. 3 illustrates an example architectural flow diagram 300 of using a task scoring machine-learning model 305 to identify servicing agents for performing tasks of new types, in accordance with one or more embodiments. The online system 140 may maintain (e.g., in the data store 240) catalog data 304 that include a list of tuples 306 for each servicing agent from a collection of servicing agents (e.g., servicing agents associated with a specific geographic region). Each tuple in the list of tuples 306 may include a respective score for each servicing agent and an identifier of a respective task type of a collection of task types, where the respective score indicates a level of aptitude of each servicing agent to perform a task of the respective task type. In addition to the list of tuples 306, the catalog data may also include descriptions of tasks of the collection of task types. The collection of task types may correspond to task types that were previously defined by the online system 140 for the specific geographic region. The list of tuples 306 may be provided as input signals to the task scoring machine-learning model 305.

In addition to the list of tuples 306, the task scoring machine-learning model 305 receives a description of new task 308 as an additional input signal, i.e., the description of a task of a new task type that is different from the collection of task types previously defined for the specific geographic region. That is, the new task type may be new for the specific geographic region but has been already defined and performed in one or more other geographic regions. The order management module 220 (or some other module of the online system 140) may create a task of the new task type with a set of features that distinguishes the new task type from each task type from the collection of task types. A human or a language model (e.g., LLM of the model serving system 150) may create the description of new task 308. The description of new task 308 may be also stored in the data store 240 as part of the catalog data 304 and will be used for updating the list of tuples 306. Additionally, the description of new task 308 may be passed to the content presentation module 210.

Prior to running a machine-learning algorithm of the task scoring machine-learning model 305, the online system 140 may perform (e.g., via the machine-learning training module 230) initial training of the task scoring machine-learning model 305 using training data 302 to generate initial values for a set of parameters of the task scoring machine-learning model 305. Labels for the training data 302 may be generated (e.g., via the machine-learning training module 230) such that each label includes information about a score for each servicing agent from a different collection of servicing agents (e.g., servicing agents associated with one or more other geographic regions) for the task of the new task type and an average level of satisfaction by users of the online system 140 about how each servicing agent from the different collection of servicing agents performed the task of the new task type. After the training process is completed, in addition to the list of tuples 306 and the description of new task 308, the online system 140 may provide one or more additional inputs to the task scoring machine-learning model 305 (e.g., via the task scoring module 250), such as servicing agent data 310 and/or the chat data 312. Some additional inputs not shown in FIG. 3 may be further provided to the task scoring machine-learning model 305.

In providing the servicing agent data 310 to the task scoring machine-learning model 305, the task scoring module 250 may provide servicing agent's historical performance data related to different types of tasks (e.g., data not included in the list of tuples 306), information about replacement success rates for servicing agents, a time taken by each servicing agent to complete a given task or sub-part of a task, some other servicing agent related information, or some combination thereof. The task scoring module 250 may retrieve the servicing agent data 310 from a servicing agent catalog database stored at, e.g., the data store 240. Additionally or alternatively, the task scoring module 250 may receive some of the servicing agent data 310 in real time from agent client devices 110 via the network 130.

In providing the chat data 312 to the task scoring machine-learning model 305, the task scoring module 250 may provide excerpts from chats for a collection of users of the online system 140 in relation to users' satisfaction with different tasks (or services) performed by servicing agents, assessment of different services, information about the users' explicit scoring about various services (e.g., bagging, communication, delivery, etc.). The task scoring module 250 may retrieve the chat data 312 from a user catalog database stored at, e.g., the data store 240. Additionally or alternatively, the task scoring module 250 may receive some of the chat data 312 in real time from user client devices 100 via the network 130.

In one or more embodiments, prior to running the machine-learning algorithm of the task scoring machine-learning model 305, the online system 140 may identify, among the collection of servicing agents, a set of servicing agents who are eligible for performing the task of the new task type. The set of servicing agents may include servicing agents that are currently online and ready to accept new tasks. Alternatively or additionally, the set of servicing agents may include only those servicing agents from the collection of servicing agents having highest average scores for the previously defined task types (e.g., as available from the catalog data 304 and/or the list of tuples 306).

The task scoring machine-learning model 305 may apply the machine-learning algorithm to the list of tuples 306, the description of new task 308, the servicing agent data 310, and/or the chat data 312 to generate a task score 314 for each servicing agent from the set of servicing agents that is indicative of a level of aptitude of each servicing agent from the set of servicing agents for performing the task of the new task type. The task scoring machine-learning model 305 may pass task scores 314 for the set of servicing agents to the servicing agent selection module 260. Additionally, the task scores 314 for the set of servicing agents may be stored at the data store 240 as part of the catalog data 304, e.g., as an update to the list of tuples 306.

The servicing agent selection module 260 may rank the set of servicing agents using their task scores 314 and select a subset of servicing agents 316 as a defined number of servicing agents having the highest task scores 314. Alternatively, the servicing agent selection module 260 may select, using the task scores 314, a subset of servicing agents 316 such that each servicing agent from the subset of servicing agents 316 has the task score 314 above a threshold score. The servicing agent selection module 260 may pass information about the subset of servicing agents 316 to the content presentation module 210.

The content presentation module 210 may generate, using information about the subset of servicing agents 316 and the description of new task 308, a user interface signal 318. The content presentation module 210 may communicate, via the network 130, the user interface signal 318 to agent client devices 110 associated with the subset of servicing agents 316. The user interface signal 318 may cause each agent client device 110 to display a user interface with an offer for each servicing agent from the subset of servicing agents 316 to accept the task of the new task type. Upon receiving a response signal from a servicing agent from the subset of servicing agents 316 indicating the acceptance of the new task, the user interface signal 318 may cause a user interface of the agent client device 110 associated with that specific servicing agent to display information about the new task type and instructions for performing the task of the new task type (e.g., as derived based on the description of new task 308).

A user client device 100 associated with a user of the online system 140 in communication with the agent client device 110 may generate and record a user feedback signal 320 including information about a level of satisfaction by the user in relation to a quality of performing the task of the new task type by the servicing agent from the subset of servicing agents 316. The online system 140 may receive (e.g., via the machine-learning training module 230) the user feedback signal 330 from the user client device 100 via the network 130. The machine-learning training module 230 may utilize the user feedback signal 320 to re-train the task scoring machine-learning model 305. By utilizing user feedback signals 320 provided by various users over time, the machine-learning training module 230 may continuously update the set of parameters of the task scoring machine-learning model 305 and continuously improve the machine-learning algorithm of the task scoring machine-learning model 305.

FIG. 4 is a flowchart for a method of using a trained machine-learning model of an online system to identify servicing agents for performing tasks of new types, in accordance with one or more embodiments. Alternative embodiments may include more, fewer, or different steps from those illustrated in FIG. 4, and the steps may be performed in a different order from that illustrated in FIG. 4. These steps may be performed by an online system (e.g., the online system 140). Additionally, each of these steps may be performed automatically by the online system without human intervention.

The online system 140 maintains 405, in a database (e.g., the data store 240), a list of tuples for each of a plurality of servicing agents, each tuple in the list of tuples including a respective score for each of the plurality of servicing agents and an identifier of a respective task type of a plurality of task types, the respective score indicating a level of aptitude of each of the plurality of servicing agents to perform a task of the respective task type. The online system 140 obtains 410 (e.g., via the data collection module 200 or the order management module 220) a description for a task of a new task type, the new task type different from each of the plurality of task types. The online system 140 identifies 415 (e.g., via the order management module 220 or the servicing agent selection module 260), among the plurality of servicing agents, a set of servicing agents who are eligible for performing the task of the new task type.

The online system 140 may create (e.g., via the order management module 220) the task of the new task type having a set of features that distinguishes the new task type from each of the plurality of task types. The online system 140 may generate (e.g., via the order management module 220), using the set of features, the description for the task of the new task type.

The online system 140 accesses 420 a task scoring machine-learning model of the online system 140 (e.g., via the task scoring module 250), wherein the task scoring machine-learning model is trained to predict, for each servicing agent from the set of servicing agents, a level of aptitude of each servicing agent from the set of servicing agents for performing the task of the new task type. The online system 140 applies 425 the task scoring machine-learning model (e.g., via the task scoring module 250) to the list of tuples for each servicing agent from the set of servicing agents and the description for the task of the new task type to generate a task score for each servicing agent from the set of servicing agents that is indicative of the level of aptitude of each servicing agent from the set of servicing agents for performing the task of the new task type.

The online system 140 may receive (e.g., at the task scoring module 250), from each device associated with each servicing agent from the set of servicing agents and via the network, information about a time spent by each servicing agent from the set of servicing agents to complete each portion of a task of a task type of the plurality of task types. The online system 140 may apply (e.g., via the task scoring module 250) the task scoring machine-learning model further to the information about the time to generate the task score for each servicing agent from the set of servicing agents.

The online system 140 may obtain (e.g., via the data collection module 200 or the order management module 220) a description for a task of a task type of the plurality of task types. The online system 140 may apply the task scoring machine-learning model (e.g., via the task scoring module 250) to a portion of the list of tuples for one or more servicing agents of the plurality of servicing agents and the description for the task of the task type to generate a score for each of the one or more servicing agents that is indicative of a level of aptitude of each of the one or more servicing agents for performing the task of the task type. To maintain the list of tuples, the online system 140 may store (e.g., via the task scoring module 250), in the list of tuples, the score for each of the one or more servicing agents and an identifier of each of the one or more servicing agents.

The online system 140 selects 430 (e.g., via the servicing agent selection module 260), from the set of servicing agents and using the task score for each servicing agent, a subset of servicing agents. In one or more embodiments, each servicing agent from the subset of servicing agents has the task score above a threshold score. In one or more other embodiments, the servicing agent selection module 260 selects a predefined number of servicing agents, e.g., N servicing agents with highest task scores. The online system 140 generates 435 (e.g., via the content presentation module 210), using information about the subset of servicing agents, a first user interface signal. The online system 140 sends 440 (e.g., via the content presentation module 210), via a network (e.g., the network 130), the first user interface signal to a plurality of devices associated with the subset of servicing agents (e.g., agent client devices 110), wherein the sending the first user interface signal causes each of the plurality of devices to display a user interface with a user interface element for use by each servicing agent from the subset of servicing agents to accept the task of the new task type.

The online system 140 may generate (e.g., via the task scoring module 250) each of a plurality of new tuples that includes the task score for each servicing agent from the set of servicing agents and an identifier of each servicing agent from the set of servicing agents. The online system 140 may update (e.g., via the task scoring module 250) the list of tuples by adding the plurality of new tuples to the list of tuples.

The online system 140 may receive (e.g., at the order management module 220), via the network from a device of the plurality of devices associated with a servicing agent from the subset of servicing agents (e.g., the agent client device 110), a signal indicating the servicing agent accepted to perform the task of the new task type. Responsive to receiving the signal, the online system 140 may generate (e.g., via the content presentation module 210), using information about the task of the new task type, a second user interface signal. The online system 140 may send (e.g., via the content presentation module 210), via the network, the second user interface signal to the device associated with the servicing agent, wherein the sending the second user interface signal causes the device associated with the servicing agent to display a user interface with the information about the task of the new task type and instructions for performing the task of the new task type.

The online system 140 may receive (e.g., at the order management module 220), via the network from a device of the plurality of devices associated with a servicing agent from the subset of servicing agents (e.g., the agent client device 110), a signal indicating the servicing agent accepted to perform the task of the new task type. Responsive to receiving the signal, the online system 140 may generate (e.g., via the prompting module 270) a prompt for input into a language model (e.g., LLM of the model serving system 150), the prompt including information about the servicing agent in relation to performing one or more tasks of one or more of the plurality of task types and the description for the task of the new task type. The online system 140 may request (e.g., via the prompting module 270) the language model to generate, based on the prompt input into the language model, a response that includes a list of questions for the servicing agent in relation to the task of the new task. The online system 140 may generate (e.g., via the content presentation module 210), using the list of questions, a second user interface signal. The online system 140 may send (e.g., via the content presentation module 210), via the network, the second user interface signal to the device associated with the servicing agent, wherein the sending the second user interface signal causes the device associated with the servicing agent to display a user interface with the list of questions for the servicing agent in relation to the task of the new task type.

The online system 140 may receive (e.g., at the order management module 220), from the device associated with the servicing agent and via the network, a response signal including information about responses by the servicing agent to the list of questions, the responses entered via the user interface of the device associated with the servicing agent. Responsive to receiving the response signal, the online system 140 may generate (e.g., via the content presentation module 210), using information about the task of the new task type, a third user interface signal. The online system 140 may send (e.g., via the content presentation module 210), via the network, the third user interface signal to the device associated with the servicing agent, wherein the sending the third user interface signal causes the device associated with the servicing agent to display the user interface with the information about the task of the new task type and instructions for performing the task of the new task type.

The online system 140 may generate (e.g., via the machine-learning training module 230) a plurality of labels for training data, each label of the plurality of labels including information about a score for each of the plurality of servicing agents for a task of a task type of the plurality of task types and an average level of satisfaction by a plurality of users of the online system 140 about how each of the plurality of servicing agents performed the task of the task type. The online system 140 may train (e.g., via the machine-learning training module 230), using the training data including the plurality of labels, the task scoring machine-learning model to generate a set of initial values for a set of parameters of the task scoring machine-learning model.

The online system 140 may generate (e.g., via the machine-learning training module 230) a plurality of labels for training data, each label of the plurality of labels including information about a score for each servicing agent from a collection of servicing agents (e.g., servicing agents from a different geographical region) different from the plurality of servicing agents for the task of the new task type and an average level of satisfaction by a plurality of users of the online system 140 about how each servicing agent from the collection of servicing agents performed the task of the new task type. The online system 140 may train (e.g., via the machine-learning training module 230), using the training data including the plurality of labels, the task scoring machine-learning model to generate a set of initial values for a set of parameters of the task scoring machine-learning model.

The online system 140 may receive (e.g., at the machine-learning training module 230), via the network from a device associated with a user of the online system 140 (e.g., the user client device 100), feedback data with information about a level of satisfaction by the user in relation to a quality of performing the task of the new task type by a servicing agent from the subset of servicing agents. The online system 140 may re-train the task scoring machine-learning model by updating (e.g., via the machine-learning training module 230), using the feedback data, a set of parameters of the task scoring machine-learning model.

Embodiments of the present disclosure are directed to the online system 140 that uses a trained machine-learning model to identify servicing agents for performing tasks of new types. The machine-learning model may identify the best servicing agents for a task of a new type as the servicing agents with highest ability scores. The online system 140 may then utilize the ability scores generated by the machine-learning model to rank the servicing agents to whom the online system 140 will push out the tasks of new types. The online system 140 presented herein deploys the trained machine-learning model to promote new (or additional) task types to existing servicing agents to increase their earnings potential and work flexibility. When a new task type is introduced in a particular region, the online system 140 may generate recommendations for which servicing agents the online system 140 should prompt to identify if these servicing agents are interested in trying out a new task type.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a non-limiting example, the condition "A, B, or C" is satisfied when A and B are true (or present) and C is false (or not present). Similarly, as another non-limiting example, the condition "A, B, or C" is satisfied when A is true (or present) and B and C are false (or not present).

What is claimed is:

1. A method, performed at a computer system comprising a processor and a computer-readable medium, comprising:

maintaining, in a database, a list of tuples for each of a plurality of servicing agents, each tuple in the list of tuples including a respective score for each of the plurality of servicing agents and an identifier of a respective task type of a plurality of task types, the respective score indicating a level of aptitude of each of the plurality of servicing agents to perform a task of the respective task type;

obtaining a description for a task of a new task type, the new task type different from each of the plurality of task types;

identifying, among the plurality of servicing agents, a set of servicing agents who are eligible for performing the task of the new task type;

accessing a task scoring model, wherein the task scoring model is a machine-learning model trained to predict, for each servicing agent from the set of servicing agents, a level of aptitude of each servicing agent from the set of servicing agents for performing the task of the new task type, wherein training of the task scoring model comprises:

generating a plurality of labels using the list of tuples, each label of the plurality of labels including information about a score for each of the plurality of servicing agents for a task of a task type of the plurality of task types different from the new task type and an average level of satisfaction by a plurality of users of an online system about how each of the plurality of servicing agents performed the task of the task type, obtaining a plurality of training examples, each of the plurality of training examples including performance data related to a respective servicing agent of the plurality of servicing agents, applying the task scoring model to the plurality of training examples to generate a plurality of outputs, each of the plurality of outputs related to the respective servicing agent, comparing each of the plurality of outputs to a respective label of the plurality of labels to generate an error score for each of the plurality of outputs, and generating a set of initial values for a set of parameters of the task scoring model using the error score for each of the plurality of outputs;

applying the task scoring model to the list of tuples for each servicing agent from the set of servicing agents and the description for the task of the new task type to generate a task score for each servicing agent from the set of servicing agents that is indicative of the level of aptitude of each servicing agent from the set of servicing agents for performing the task of the new task type;

selecting, from the set of servicing agents and using the task score for each servicing agent, a subset of servicing agents;

generating, using information about the subset of servicing agents, a first user interface signal; and sending, via a network, the first user interface signal to a plurality of devices associated with the subset of servicing agents, wherein sending the first user interface signal causes each of the plurality of devices to display a user interface with a user interface element for use by each servicing agent from the subset of servicing agents to accept the task of the new task type.

2. The method of claim 1, wherein maintaining the list of tuples comprises:

obtaining a description for a task of a task type of the plurality of task types;

applying the task scoring model to a portion of the list of tuples for one or more servicing agents of the plurality of servicing agents and the description for the task of the task type to generate a score for each of the one or more servicing agents that is indicative of a level of aptitude of each of the one or more servicing agents for performing the task of the task type; and storing, in the list of tuples, the score for each of the one or more servicing agents and an identifier of each of the one or more servicing agents.

3. The method of claim 1, further comprising:

generating each of a plurality of new tuples that includes the task score for each servicing agent from the set of servicing agents and an identifier of each servicing agent from the set of servicing agents; and updating the list of tuples by adding the plurality of new tuples to the list of tuples.

4. The method of claim 1, further comprising:

receiving, via the network from a device of the plurality of devices associated with a servicing agent from the subset of servicing agents, a signal indicating the servicing agent accepted to perform the task of the new task type;

responsive to receiving the signal, generating, using information about the task of the new task type, a second user interface signal; and sending, via the network, the second user interface signal to the device associated with the servicing agent, wherein sending the second user interface signal causes the device associated with the servicing agent to display a user interface with the information about the task of the new task type and instructions for performing the task of the new task type.

5. The method of claim 1, further comprising:

receiving, via the network from a device of the plurality of devices associated with a servicing agent from the subset of servicing agents, a signal indicating the servicing agent accepted to perform the task of the new task type;

responsive to receiving the signal, generating a prompt for input into a language model, the prompt including information about the servicing agent in relation to performing one or more tasks of one or more of the plurality of task types and the description for the task of the new task type;

requesting the language model to generate, based on the prompt input into the language model, a response that includes a list of questions for the servicing agent in relation to the task of the new task type;

generating, using the list of questions, a second user interface signal; and sending, via the network, the second user interface signal to the device associated with the servicing agent, wherein sending the second user interface signal causes the device associated with the servicing agent to display a user interface with the list of questions for the servicing agent in relation to the task of the new task type.

6. The method of claim 5, further comprising:

receiving, from the device associated with the servicing agent and via the network, a response signal including information about responses by the servicing agent to the list of questions, the responses entered via the user interface of the device associated with the servicing agent;

responsive to receiving the response signal, generating, using information about the task of the new task type, a third user interface signal; and sending, via the network, the third user interface signal to the device associated with the servicing agent, wherein sending the third user interface signal causes the device associated with the servicing agent to display the user interface with the information about the task of the new task type and instructions for performing the task of the new task type.

7. The method of claim 1, wherein obtaining the description for the task of the new task type comprises:

creating the task of the new task type having a set of features that distinguishes the new task type from each of the plurality of task types; and generating, using the set of features, the description for the task of the new task type.

8. The method of claim 1, wherein applying the task scoring model further comprises:

receiving, from each device associated with each servicing agent from the set of servicing agents and via the network, information about a time spent by each servicing agent from the set of servicing agents to complete each portion of a task of a task type of the plurality of task types; and applying the task scoring model further to the information about the time to generate the task score for each servicing agent from the set of servicing agents.

9. The method of claim 1, further comprising:

generating a second plurality of labels for training data, each label of the second plurality of labels including information about a score for each servicing agent from a collection of servicing agents different from the plurality of servicing agents for the task of the new task type and an average level of satisfaction by a set of users of the online system about how each servicing agent from the collection of servicing agents performed the task of the new task type; and training, using the training data including the second plurality of labels, the task scoring model to generate the set of initial values for the set of parameters of the task scoring model.

10. The method of claim 1, further comprising:

receiving, via the network from a device associated with a user of the online system, feedback data with information about a level of satisfaction by the user in relation to a quality of performing the task of the new task type by a servicing agent from the subset of servicing agents; and re-training the task scoring model by updating, using the feedback data, the set of parameters of the task scoring model.

11. A computer program product comprising a non-transitory computer readable storage medium having instructions encoded thereon that, when executed by a processor, cause the processor to perform steps comprising:

maintaining, in a database, a list of tuples for each of a plurality of servicing agents, each tuple in the list of tuples including a respective score for each of the plurality of servicing agents and an identifier of a respective task type of a plurality of task types, the respective score indicating a level of aptitude of each of the plurality of servicing agents to perform a task of the respective task type;

obtaining a description for a task of a new task type, the new task type different from each of the plurality of task types;

identifying, among the plurality of servicing agents, a set of servicing agents who are eligible for performing the task of the new task type;

accessing a task scoring model, wherein the task scoring model is a machine-learning model trained to predict, for each servicing agent from the set of servicing agents, a level of aptitude of each servicing agent from the set of servicing agents for performing the task of the new task type, wherein training of the task scoring model comprises:

generating a plurality of labels using the list of tuples, each label of the plurality of labels including information about a score for each of the plurality of servicing agents for a task of a task type of the plurality of task types different from the new task type and an average level of satisfaction by a plurality of users of an online system about how each of the plurality of servicing agents performed the task of the task type, obtaining a plurality of training examples, each of the plurality of training examples including performance data related to a respective servicing agent of the plurality of servicing agents, applying the task scoring model to the plurality of training examples to generate a plurality of outputs, each of the plurality of outputs related to the respective servicing agent, comparing each of the plurality of outputs to a respective label of the plurality of labels to generate an error score for each of the plurality of outputs, and generating a set of initial values for a set of parameters of the task scoring model using the error score for each of the plurality of outputs;

applying the task scoring model to the list of tuples for each servicing agent from the set of servicing agents and the description for the task of the new task type to generate a task score for each servicing agent from the set of servicing agents that is indicative of the level of aptitude of each servicing agent from the set of servicing agents for performing the task of the new task type;

selecting, from the set of servicing agents and using the task score for each servicing agent, a subset of servicing agents;

generating, using information about the subset of servicing agents, a first user interface signal; and sending, via a network, the first user interface signal to a plurality of devices associated with the subset of servicing agents, wherein sending the first user interface signal causes each of the plurality of devices to display a user interface with a user interface element for use by each servicing agent from the subset of servicing agents to accept the task of the new task type.

12. The computer program product of claim 11, wherein the instructions further cause the processor to perform steps comprising:

obtaining a description for a task of a task type of the plurality of task types;

applying the task scoring model to a portion of the list of tuples for one or more servicing agents of the plurality of servicing agents and the description for the task of the task type to generate a score for each of the one or more servicing agents that is indicative of a level of aptitude of each of the one or more servicing agents for performing the task of the task type; and storing, in the list of tuples, the score for each of the one or more servicing agents and an identifier of each of the one or more servicing agents.

13. The computer program product of claim 11, wherein the instructions further cause the processor to perform steps comprising:

generating each of a plurality of new tuples that includes the task score for each servicing agent from the set of servicing agents and an identifier of each servicing agent from the set of servicing agents; and updating the list of tuples by adding the plurality of new tuples to the list of tuples.

14. The computer program product of claim 11, wherein the instructions further cause the processor to perform steps comprising:

receiving, via the network from a device of the plurality of devices associated with a servicing agent from the subset of servicing agents, a signal indicating the servicing agent accepted to perform the task of the new task type;

responsive to receiving the signal, generating, using information about the task of the new task type, a second user interface signal; and sending, via the network, the second user interface signal to the device associated with the servicing agent, wherein sending the second user interface signal causes the device associated with the servicing agent to display a user interface with the information about the task of the new task type and instructions for performing the task of the new task type.

15. The computer program product of claim 11, wherein the instructions further cause the processor to perform steps comprising:

receiving, via the network from a device of the plurality of devices associated with a servicing agent from the subset of servicing agents, a signal indicating the servicing agent accepted to perform the task of the new task type;

responsive to receiving the signal, generating a prompt for input into a language model, the prompt including information about the servicing agent in relation to performing one or more tasks of one or more of the plurality of task types and the description for the task of the new task type;

requesting the language model to generate, based on the prompt input into the language model, a response that includes a list of questions for the servicing agent in relation to the task of the new task type;

generating, using the list of questions, a second user interface signal; and sending, via the network, the second user interface signal to the device associated with the servicing agent, wherein sending the second user interface signal causes the device associated with the servicing agent to display a user interface with the list of questions for the servicing agent in relation to the task of the new task type.

16. The computer program product of claim 15, wherein the instructions further cause the processor to perform steps comprising:

receiving, from the device associated with the servicing agent and via the network, a response signal including information about responses by the servicing agent to the list of questions, the responses entered via the user interface of the device associated with the servicing agent;

responsive to receiving the response signal, generating, using information about the task of the new task type, a third user interface signal; and sending, via the network, the third user interface signal to the device associated with the servicing agent, wherein sending the third user interface signal causes the device associated with the servicing agent to display the user interface with the information about the task of the new task type and instructions for performing the task of the new task type.

17. The computer program product of claim 11, wherein the instructions further cause the processor to perform steps comprising:

receiving, from each device associated with each servicing agent from the set of servicing agents and via the network, information about a time spent by each servicing agent from the set of servicing agents to complete each portion of a task of a task type of the plurality of task types; and applying the task scoring model further to the information about the time to generate the task score for each servicing agent from the set of servicing agents.

18. The computer program product of claim 11, wherein the instructions further cause the processor to perform steps comprising:

generating a second plurality of labels for training data, each label of the second plurality of labels including information about a score for each servicing agent from a collection of servicing agents different from the plurality of servicing agents for the task of the new task type and an average level of satisfaction by a set of users of the online system about how each servicing agent from the collection of servicing agents performed the task of the new task type;

training, using the training data including the second plurality of labels, the task scoring model to generate the set of initial values for the set of parameters of the task scoring model;

receiving, via the network from a device associated with a user of the online system, feedback data with information about a level of satisfaction by the user in relation to a quality of performing the task of the new task type by a servicing agent from the subset of servicing agents; and re-training the task scoring model by updating, using the feedback data, the set of parameters of the task scoring model.

19. A computer system comprising:

a processor; and a non-transitory computer-readable storage medium having instructions that, when executed by the processor, cause the computer system to perform steps comprising:

maintaining, in a database, a list of tuples for each of a plurality of servicing agents, each tuple in the list of tuples including a respective score for each of the plurality of servicing agents and an identifier of a respective task type of a plurality of task types, the respective score indicating a level of aptitude of each of the plurality of servicing agents to perform a task of the respective task type;

obtaining a description for a task of a new task type, the new task type different from each of the plurality of task types;

identifying, among the plurality of servicing agents, a set of servicing agents who are eligible for performing the task of the new task type;

accessing a task scoring model, wherein the task scoring model is a machine-learning model trained to predict, for each servicing agent from the set of servicing agents, a level of aptitude of each servicing agent from the set of servicing agents for performing the task of the new task type, wherein training of the task scoring model comprises:

generating a plurality of labels using the list of tuples, each label of the plurality of labels including information about a score for each of the plurality of servicing agents for a task of a task type of the plurality of task types different from the new task type and an average level of satisfaction by a plurality of users of an online system about how each of the plurality of servicing agents performed the task of the task type, obtaining a plurality of training examples, each of the plurality of training examples including performance data related to a respective servicing agent of the plurality of servicing agents, applying the task scoring model to the plurality of training examples to generate a plurality of outputs, each of the plurality of outputs related to the respective servicing agent, comparing each of the plurality of outputs to a respective label of the plurality of labels to generate an error score for each of the plurality of outputs, and generating a set of initial values for a set of parameters of the task scoring model using the error score for each of the plurality of outputs;

applying the task scoring model to the list of tuples for each servicing agent from the set of servicing agents and the description for the task of the new task type to generate a task score for each servicing agent from the set of servicing agents that is indicative of the level of aptitude of each servicing agent from the set of servicing agents for performing the task of the new task type;

selecting, from the set of servicing agents and using the task score for each servicing agent, a subset of servicing agents;

generating, using information about the subset of servicing agents, a first user interface signal; and sending, via a network, the first user interface signal to a plurality of devices associated with the subset of servicing agents, wherein the sending the first user interface signal causes each of the plurality of devices to display a user interface with a user interface element for use by each servicing agent from the subset of servicing agents to accept the task of the new task type.

* * * * *